(12) United States Patent
Brandreth, III

(10) Patent No.: US 6,267,886 B1
(45) Date of Patent: Jul. 31, 2001

(54) UNI-DIRECTIONAL FLOW CHEMICAL DISPENSER

(76) Inventor: John B. Brandreth, III, P.O. Drawer 1068 158 Railroad St., Canton, GA (US) 30014

(*) Notice: Subject to any disclaimer, the term of this patent is extended or adjusted under 35 U.S.C. 154(b) by 0 days.

(21) Appl. No.: 09/510,001

(22) Filed: Feb. 20, 2000

(51) Int. Cl.[7] ................................................. B01D 11/02
(52) U.S. Cl. .................... 210/206; 210/446; 422/264; 422/277; 137/268
(58) Field of Search ............................ 210/169, 205, 210/206, 256, 261, 416.2, 446, 450, 493.5; 422/261, 277, 276, 264; 137/268

(56) References Cited

U.S. PATENT DOCUMENTS

| | | |
|---|---|---|
| 2,891,622 | 6/1959 | Patterson et al. . |
| 3,195,558 | 7/1965 | Klueber et al. . |
| 3,481,857 * | 12/1969 | Gray ..................................... 210/169 |
| 3,579,440 | 5/1971 | Bradley, Jr. . |
| 3,612,080 | 10/1971 | Schneider et al. . |
| 4,347,224 | 8/1982 | Beckert et al. . |
| 4,780,197 | 10/1988 | Schuman . |
| 5,181,533 * | 1/1993 | Kooi ..................................... 137/268 |
| 5,573,666 * | 11/1996 | Korin ..................................... 210/435 |
| 5,580,448 | 12/1996 | Brandreth, III . |
| 5,855,777 * | 1/1999 | Bachand et al. ..................... 210/205 |
| 5,927,610 * | 7/1999 | Dutcher ................................ 137/268 |
| 5,993,753 * | 11/1999 | Davidson ............................. 210/205 |

* cited by examiner

Primary Examiner—David A. Simmons
Assistant Examiner—Frank M. Lawrence
(74) Attorney, Agent, or Firm—Thomas C. Saitta

(57) ABSTRACT

A device for delivering chemical solutions into a liquid flow, where said chemical solution is created by dissolving solid chemical contained within a chemical cartridge, the device having a uni-directional flow housing connected into a fluid flow line, and further having a chemical dispenser having an upper conduit member, an apertured midsection and a chemical containing lower cartridge, the cartridge having an intake aperture located on the upper portion of its side wall and a dispensing aperture on its top, such that a saturated chemical solution is formed in said cartridge and passes into the liquid flow through the dispensing aperture due to the pressure differential of the liquid flowing into the apertured midsection and through the upper conduit out of the device.

24 Claims, 4 Drawing Sheets

UNI-DIRECTIONAL FLOW CHEMICAL DISPENSER

BACKGROUND OF THE INVENTION

This invention relates generally to the field of dispenser devices used to introduce into a flowing liquid small quantities of a chemical solution created by dissolving a solid or granular chemical. More particularly, the invention relates to such devices to be used as a component in water circulation or supply systems, where the rate of introduction of the dissolved chemical into the water is controlled in a manner related to the flow volume of the water stream to insure proper concentration percentage. Even more particularly, the invention relates to replaceable dispensing means which comprise a cartridge which contains the solid chemical and are retained within a housing, where the dispensing means is utilized with in-line or uni-directional flow housings.

It is desirable or necessary in many water supply or recirculation systems, such as water for household or industrial use, or water for use in spas and pools, to add certain chemicals to the water to control bacteria or fungal growth, corrosion, scale deposits, etc. Commonly known additives include chlorine, polyphosphate or sodium silicate. Such additives are typically supplied in solid or granular form for ease of handling, and must therefore be dissolved in liquid to create a solution then introduced into the water flow. It is imperative that the chemical additives be supplied in the proper concentration, and it is important that the mechanism for adding the chemical solutions provide for proper rate introduction with little variation in concentration. Many conventional systems fail these criteria, the mechanisms being unable to prevent variations in concentration and introduction rates, especially in circumstances where the water flow is not continuous and varies in pressure.

The most simplistic solid chemical additive mechanisms simply divert all or a portion of the water flow stream through a container holding the solid chemical. The water flowing from the container will then include an amount of dissolved chemical. These devices suffer from lack of dispensing control, since the amount of chemical present in the outflow is dependent on the volume of solid chemical in the container. As that volume decreases, the concentration of dissolved chemical in the outflow also decreases. Additionally, this type of system produces a highly concentrated chemical surge when water flow is resumed after being shut off for a period of time. Finally, variation in the water flow rate will not correspondingly alter the dissolving rate of the chemical, producing incorrect concentration amounts in the outflow.

Attempts have been made to develop a mechanism which addresses the problems encountered in correctly metering and controlling the chemical introduction and concentration rates, but known systems are either overly complicated or do not fully solve all the problems set forth above. A complicated mechanism is described in U.S. Pat. No. 4,780,197 to Schuman, which discloses a flow-through chemical dispenser cartridge positioned within the internal core of a filter which requires one or more operational valves to perform effectively. A more simplified approach is shown in U.S. Pat. No. 4,347,224 to Beckert et al. This patent discloses a flow housing which contains an internally mounted chemical cartridge. A small amount of the water flow is diverted into the bottom of the chemical cartridge and the chemical solution is drawn through a small aperture in the top of the cartridge by the pressure differential created by the flow of the bulk of the water passing through the housing. This apparatus provides a simple approach to solving the problems encountered in standard solid chemical systems, but the mechanism is just a variation of the standard system where a portion of the water stream is passed through the solid chemical before being returned to the main flow stream. The distinction in Beckert et al. is that the cartridge containing the solid chemical is mounted within a large housing through which all the water flows. The sizing of the cartridge is such to create an annular passage down to the bottom of the chemical cartridge, where the water flows through a plurality of liquid inlet holes, past the chemical and out the liquid outlet hole. In effect, the annular passage is just a substitute for a small bypass conduit as found in many old systems, and the problems associated with variations in concentration and surging would still be present.

A much improved design and construction for a flow-through chemical dispenser is shown in my U.S. Pat. No. 5,580,448, wherein a unique cartridge configuration is used to correctly meter and control the chemical introduction and concentration rates of the dissolved solid chemical into the liquid flow stream. The dispenser unit has an upper base member with inlet and outlet openings, and a depending housing is threaded onto the base. A dispenser means comprising an upper tube, an apertured midsection and a cartridge containing the solid chemical is coaxially mounted within the housing, such that water flows through an annular filter, into flow openings in the apertured midsection above the cartridge and out from the top of the upper tube. While the dispenser unit functions at optimum efficiency, the design of the dispenser means is limiting in that particular flow paths are dictated by the housing structure.

It is an object of this invention to provide a dispenser device which provides a steady state concentration of dissolved chemical, which introduces the chemical solution into the main water stream in amounts directed related to water flow rate or volume to maintain precise percentages of chemical solution, which does not produce excessive chemical concentration during periods of no water flow, and which does not introduce excessive amounts of dissolved chemical when water flow is resumed. It is an object to provide such a device where the cartridge containing the solid chemical is not a flow through cartridge, such that water is not passed through the solid chemical. It is an object to provide such a device where the chemical cartridge can be used alone or in combination with a filter or other treating media. It is an object to provide such a device where the dispenser device containing the dispenser means is an in-line or unidirectional flow dispenser.

SUMMARY OF THE INVENTION

The invention is a chemical solution dispensing device and comprises in general a dispensing means which is incorporated within a unidirectional, flow-through housing member having an inlet opening connected to a water supply conduit and an outlet opening connected to a water outflow conduit. The housing, generally cylindrical in configuration, is adapted to receive a centrally positioned, generally tubular dispensing means comprising a lower portion chemical cartridge having a closed bottom, a side wall having one or more relatively small openings into the interior of the cartridge positioned near the top of the side wall, and a top wall having one or more relatively small openings into the interior of the cartridge, within which is deposited the solid or granular chemical additive, an upper conduit portion having an open bottom and top, and an apertured midsection having relatively large openings for large volume water flow. In one embodiment, the open top is adapted to join with the outflow conduit in connecting manner. In another embodiment, an annular seal is provided between the housing and the upper conduit portion to direct all water flow through the dispensing means. The cylindrical housing may also contain a hollow core filter or filter wrap material which surrounds the dispensing means, and may further contain other treatment media, such as granulated activated charcoal, retained in an apertured container or retained by a tubular screen or filter wrap surrounding the dispensing means.

Once the dispensing means is installed into the housing and water flow is initiated, the pressure differential caused by the large volume flow of water into the apertured midsection and across the small opening in the top of the chemical cartridge draws a small amount of dissolved chemical solution through the small top opening and into the main water flow stream, while simultaneously drawing an equally small amount of water into the upper interior of the chemical cartridge to replace the suctioned chemical solution. Because the chemical cartridge has only two, or a small number of, relatively small openings in relation to the internal volume of the chemical cartridge, the solution contained within the cartridge portion of the dispensing device becomes chemically saturated within a short time after water is first introduced into the housing. The solution within the chemical cartridge remains saturated even when water flow is occurring, since the amount of water drawn into the small side opening to replace the amount of chemical solution drawn out of the small top opening is proportionately small relative to the total volume of the saturated solution contained within the chemical cartridge. Because the solution in the cartridge is saturated, there will be no change in concentration during periods when no water flow is occurring.

A plural number of dispensing devices can be connected in parallel, such that total flow rate can be increased without altering the size of the individual dispenser devices. Sensing or metering devices can be provided downstream, or both upstream and downstream, of the dispensing device in order to monitor the concentration of chemical in the outflow water.

DETAILED DESCRIPTION OF THE INVENTION

Figure 1:
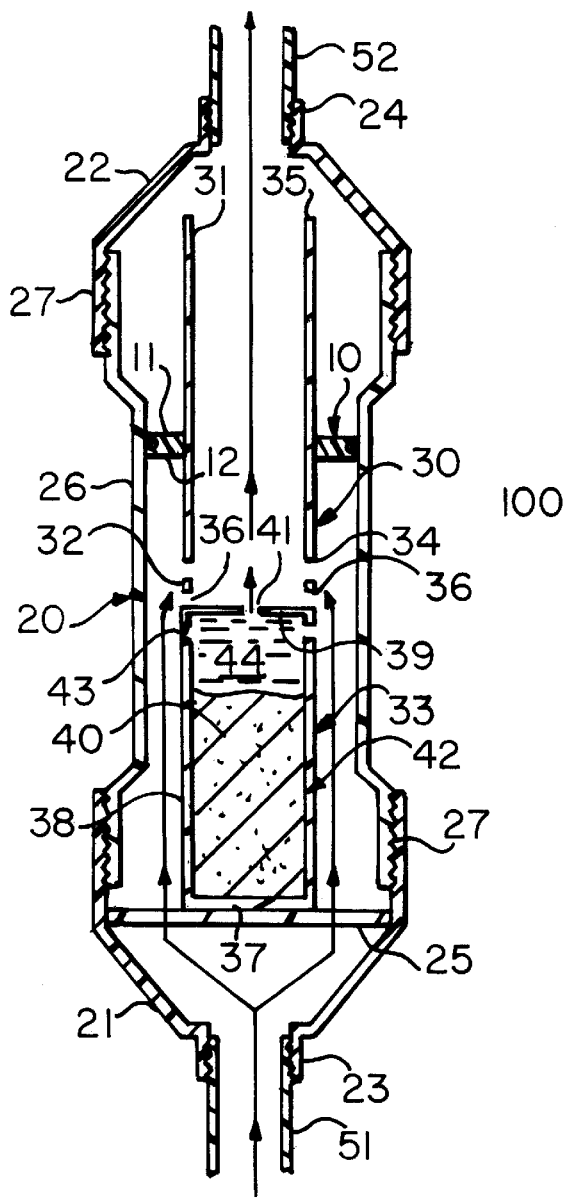
FIG. 1 is a cross-sectional view of the chemical dispensing device, showing the dispensing means mounted within a uni-directional flow housing.
Figure 2:
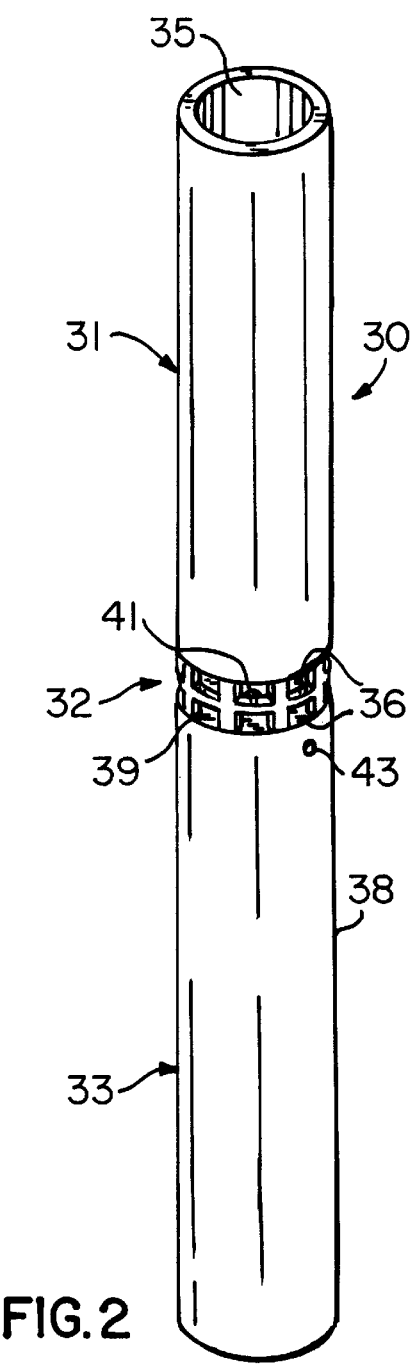
FIG. 2 is a perspective view of the dispensing means as removed from the housing.

The invention will now be described in detail, in conjunction with the drawings, with regard for the best mode and preferred embodiment. The invention is a chemical dispenser device for introducing a chemical solution of predetermined concentration and amount into a flow of liquid, the dispenser being incorporated within a uni-directional or in-line flow housing connected to inflow and outflow conduits of a water or other liquid delivery system, such as found in a residential or industrial setting for one-time use or recirculation, such as for a spa or pool. The chemical is presented in a solid or granular form within the chemical dispenser and dissolves to create a saturated solution to be introduced into the water flow stream, the chemical being of any soluble type which imparts beneficial properties to the water, such as prevention of bacterial, fungal, mold or other biological growth, reduction or control of deposits of scaling, etc.

With reference to the drawings, the invention is seen to be a chemical dispenser device 100 comprising in general a generally cylindrical housing 20 and a chemical dispensing means 30 contained within housing 20. The cylindrical housing 20 is adapted to be connected in a water flow line, such that housing 20 is provided with an inflow conduit 23, typically threaded, to receive the end of an inlet conduit 51 to deliver water or another liquid into the housing 20. Housing 20 is also provided with an outflow conduit 24, also typically threaded, to receive the end of an outlet conduit 52, for delivery of the treated water or other liquid for usage. The inflow conduit 23 and outflow conduit are coaxially aligned within housing 20. Preferably the inflow conduit 23 directs the water flow through a support member 25, preferably a filter disc formed from a ceramic or relatively rigid woven material, such as for example a POREX brand 20 micron filter. The support filter member 25 supports the chemical dispensing means 30 in a generally vertically oriented direction. The housing 20 is a hollow container having a main body 26, an inflow end 21 and an outflow end 22, the ends 21 and 22 preferably detachably joined to the main body 26 by coupling means 27, such as threading, mechanical interlock, friction fit or the like. This allows the housing 20 to be opened to remove and replace a depleted dispensing means 30 when necessary. The combination of main body 26, inflow end 21 and outflow end 22 form a closed system such that main water flow through the housing 20 occurs in a single direction from the inflow conduit 23 to the outflow conduit 24, often described as in-line or unidirectional.

Figure 3:
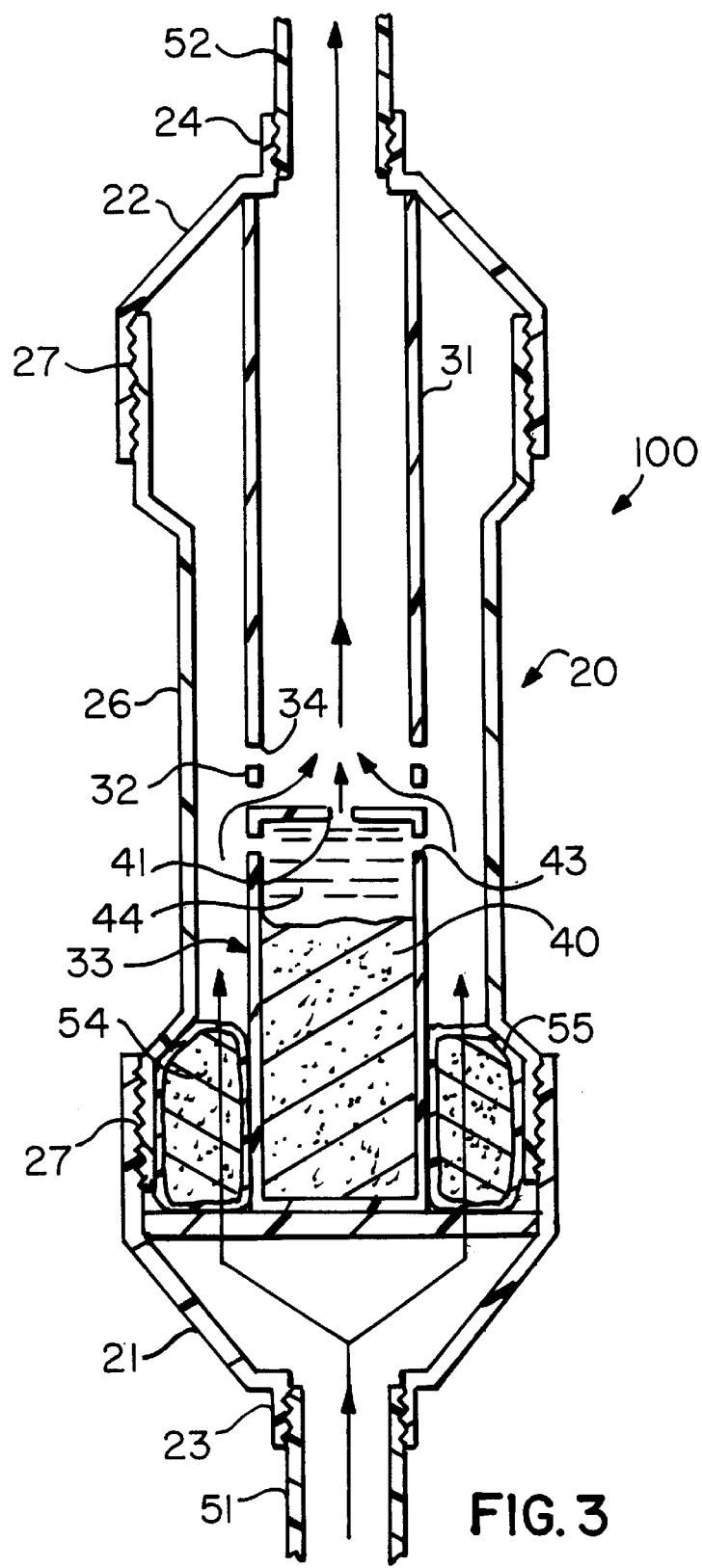
FIG. 3 is a cross-sectional view of an alternative embodiment of the invention, showing the dispensing means directly connected to the outflow conduit, and showing additional treatment media retained within a mesh retaining member.

Centrally positioned within housing 20 is chemical dispensing means 30. Dispensing means 30 is a generally tubular member comprising three main segments, an upper conduit segment 31, an apertured midsection segment 32 and a lower chemical containing cartridge member 33. The upper conduit 31 has an open bottom 34 and an open top 35, the open top 35 being adapted in one embodiment to sealingly mate with the outflow conduit 24 or upper end 22, as shown in FIG. 3. In a more preferred embodiment, as shown in FIG. 1, an annular seal member 10, such as a flange 11 and O-ring 12 combination, is provided about the upper conduit 31, such that water is blocked except through apertured midsection 32. The midsection 32 of the dispensing means 30 is comprised of one or more flow openings 36 which allow water to flow into the interior of upper conduit 31 and out through outflow conduit 24. The total area of flow openings 36 should be of sufficient amount so as not to impede flow of water through the device. The dispensing means 30 abuts or is connected to the filter disc 25.

The lower portion of the dispensing means 30 connected to and beneath the apertured midsection 32 encompasses the chemical containing cartridge member 33, which comprises a closed bottom member 37, a side wall 38 containing at least one fluid intake refilling aperture 43 and a top member 39 containing at least one dispensing aperture 41. In the preferred embodiment, there is a single intake aperture 43 and a single dispensing aperture 41. Intake aperture 43 is positioned near the top of side wall 38, preferably adjacent the top member 39. The combination of bottom member 37, side wall 38 and top member 39 form a hollow interior 42 to receive the solid or granular chemical substance 40 to be dissolved. Intake aperture 43 is the only means for water to enter the interior 42 of chemical cartridge 33 and dispensing aperture 41 is the only means for the chemical solution 44 to exit the interior 42 of chemical cartridge 33. Dispensing aperture 41 and intake aperture 43 are sized relatively small in comparison to the interior volume of cartridge 33 and in comparison to the total area of flow openings 36 in the midsection portion 32. For example, in a dispensing means 30 having an internal diameter of approximately 1 and 1/8 inches and a cartridge height of approximately 4 and 3/4 inches, the dispensing aperture 41 in top wall 39 and the intake aperture 43 in the side wall 38 should be between approximately 1/32 and 3/16 inches in diameter, and preferably about 1/16 inches in diameter. Where multiple dispensing apertures 41 or intake apertures 43 are present, the combined total size of the openings should be in the same range. The size of the intake aperture 43 should be generally equal to the size of the dispensing aperture 41. The size of the intake aperture 43 and dispensing aperture 41 determine the feed rate, and can be varied in relation to the solubility characteristics or desirable concentrations of particular solid chemicals 40 needed for a given application.

Figure 4:
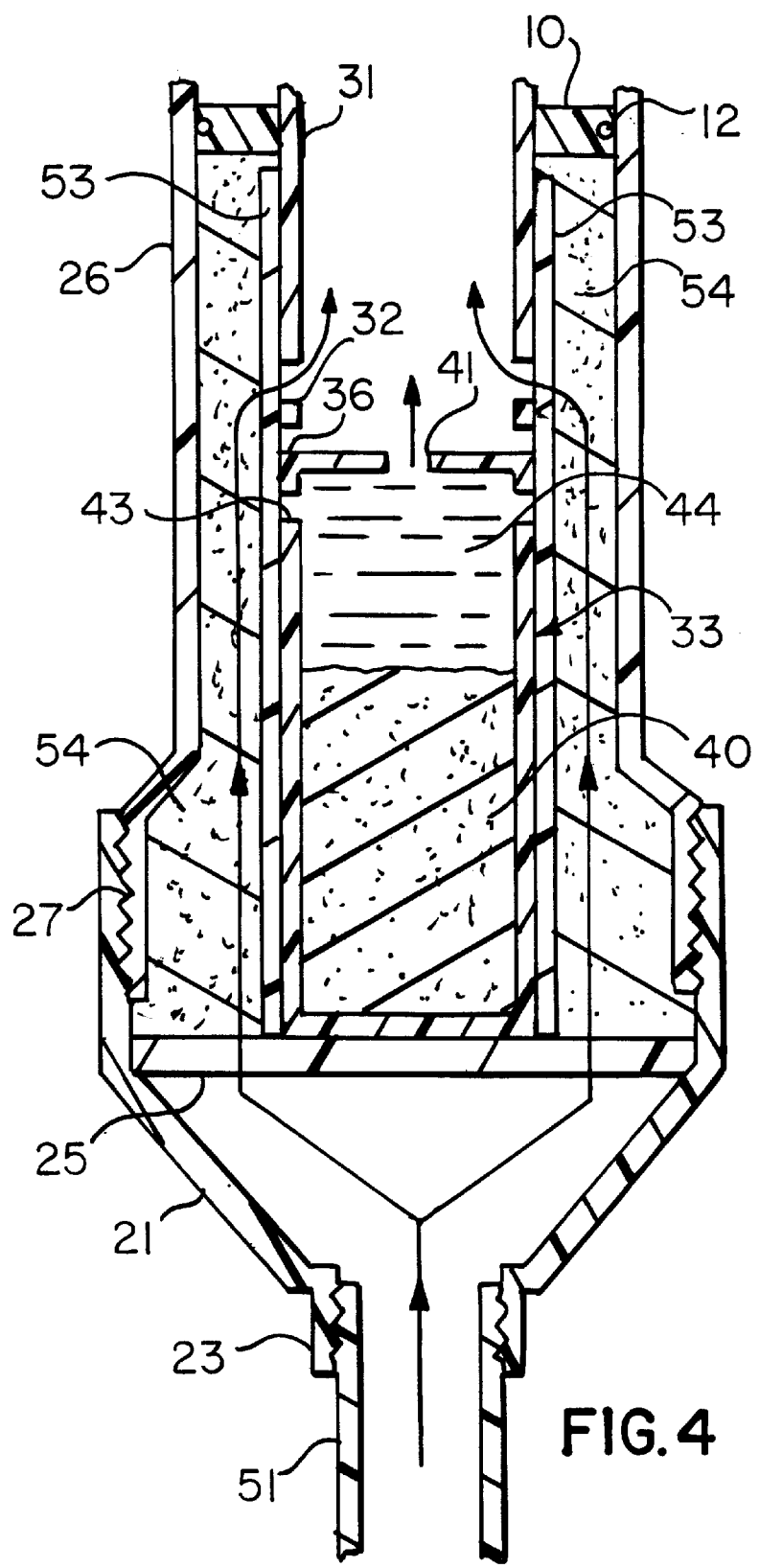
FIG. 4 is a partial cross-sectional view of still another alternative embodiment of the invention, showing a filter or screen member retaining the additional treatment media.

In alternative embodiments, a filter means 53 of known configuration and type having a cylindrical hollow core 54 is also incorporated as part of the complete mechanism. The filter means 53 may comprise a pleated membrane, a tubular ceramic filter, or a simple screen, wrap or mesh member which surrounds the dispensing means 30, such that all water must pass through the filter means 53 before entering the dispenser means 30, as shown in FIG. 4. The filter means 53 may be used, in combination with the seal member 10 and the filter disk 25, to retain additional treatment media 54 in granular form, such as for example granulated charcoal, placed within housing 20. Alternatively, the treatment media 54 may be separately retained within an apertured or liquid permeable annular container 55 surrounding the dispenser means 30, such as a mesh bag or the like, as shown in FIG. 3.

Once the invention is installed in the water flow line and water flow is initiated for the first time, the water flows through inflow conduit 23 in inflow end 21, through the filter disk 25 and into the main body 26 of housing 20. The water passes through treatment media 54 and filter means 53, if present, and contacts dispensing means 30. The only available passage is through the flow openings 36 of apertured midsection 32, since the chemical cartridge 33 has a closed bottom 37 and side wall 38, except for the tiny intake apertures 43. As water flows into the interior of midsection 32, a small amount of water enters the intake apertures 43 in the upper portion of side wall 38 of chemical cartridge 33 and fills the upper portion of the interior 42 of the cartridge 53, dissolving a portion of the solid or granular chemical 40 contained therein. After a short period of time, the percentage of chemical 40 dissolved in the water reaches its maximum saturated value, whereby no further dissolving can occur. At this point, the concentration percentage of the solution 44 becomes steady state. As water continues to flow into housing 20, the water flows up through upper conduit 31 into outflow conduit 17 through outlet opening 12 and into outflow conduit 23. The relatively large volume of water flow adjacent the dispensing aperture 41 results in a pressure differential which draws a small amount of the saturated chemical solution 44 from within the cartridge 33 out through dispensing aperture 41. This chemical solution 44 is then mixed in the turbulent flow such that water flowing from the device is treated as desired.

The amount of saturated chemical solution 44 drawn through the dispensing aperture 41 is a function of aperture size, which is predetermined, and water flow rate. As water flow rate increases the pressure differential is increased and more solution 44 is drawn out and, conversely, as water flow rate decreases the pressure differential decreases and less solution 44 is drawn out. This insures that the proper amount of saturated chemical solution 44 is introduced into the water flow no matter what flow rate is present. In addition, since the amount of saturated solution 44 drawn from the chemical cartridge 33 is relatively small in comparison to the total volume of saturated solution 44, and since the water drawn into the interior 42 through intake aperture 43 is likewise of small amount relative to the total volume of the saturated chemical solution 44, the solution 44 within the cartridge 33 remains in a constant, fully saturated condition. The chemical solution 44 remains at the same concentration within the cartridge 33 no matter what amount of solid chemical 40 is present in the cartridge 33, since the chemical solution 44 is always at a saturated level. Because the refilling aperture 43 is located in the upper portion of side wall 38, the replacement water flows into the dissolved chemical solution 44 rather than into the solid or granular chemical 40, so no surging or super-saturation can occur from flow or turbulence effects within the cartridge 33. In systems which use a flow through mechanism for dissolving the chemical and do not provide for a saturated solution, the solution added to the water when the system is restarted after a stoppage period is excessively high in concentration, since the water remaining in contact with the solid chemical during the stoppage becomes saturated.

Figure 5:
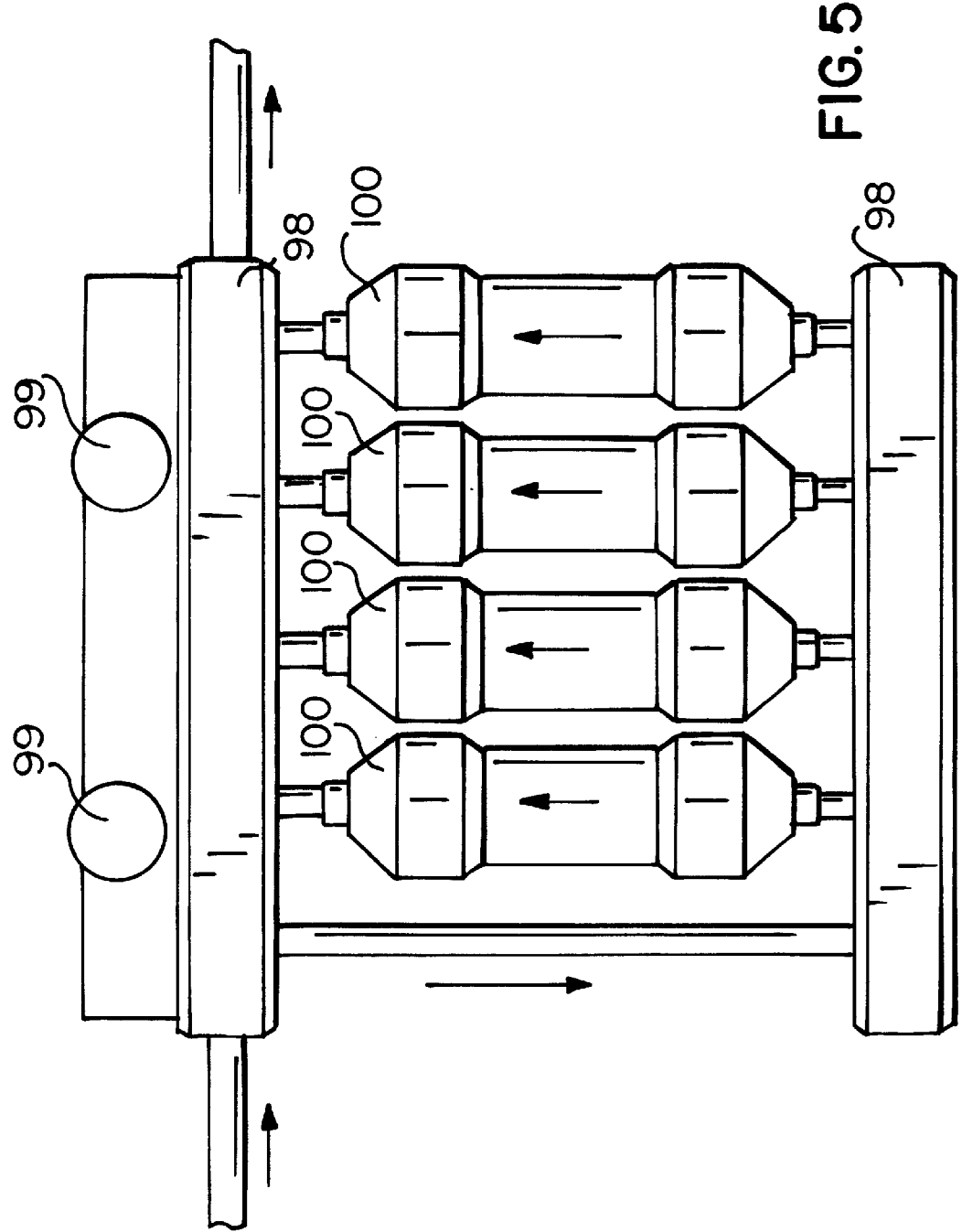
FIG. 5 is a view showing plural dispensing devices aligned in parallel.

Multiple dispensing devices 100 may be connected in parallel series with manifolds 98, as shown in FIG. 5. In this manner, flow volumes greater than the capacity of a single dispenser device 100 can be accommodated without requiring a change in the overall dimensions of the device 100. In addition, the water can also be monitored for conductivity, total dissolved solids or the like using known sensing or metering devices 99 to determine that the water flowing from the dispenser device or devices 100 contains the proper concentration of chemical solution 44. The metering devices 99 can be incorporated downstream alone or upstream as well for comparative readings.

It is contemplated that equivalents and substitutions may be apparent to those skilled in the art, and the true scope and definition of the invention therefore is to be as set forth in the following claims.

I claim:

1. A uni-directional flow chemical dispenser device for introducing a chemical solution into a flow of liquid said device comprising:

a housing adapted to be incorporated into a flow conduit line, said housing having an inflow end with an inflow conduit adapted to receive an inlet conduit and an outflow end with an outflow conduit adapted to receive an outlet conduit connected to a main body;

a chemical dispenser means disposed within said housing and comprising an upper conduit segment connected to an apertured midsection segment connected to a lower chemical containing cartridge member;

an annular seal member positioned between said housing and said upper conduit segment;

said apertured midsection segment having at least one flow opening to allow liquid to flow into said upper conduit segment;

said cartridge member comprising a closed bottom a side wall containing at least one intake aperture positioned in the upper portion of said side wall, and a top containing at least one dispensing aperture, said bottom, top and side wall defining an interior and containing a chemical in solid form;

whereby liquid enters said housing through said inflow conduit, flows past said cartridge member, through said at least one flow opening in said apertured midsection segment, through said upper conduit segment and exits said housing through said outflow conduit;

and further whereby as liquid passes said cartridge member, a small amount of said liquid enters said cartridge member through said intake aperture and contacts said chemical to dissolve said chemical and form a saturated chemical solution within said cartridge interior, and whereby said saturated solution is drawn from said cartridge member through said dispensing aperture in response to liquid flow through said apertured midsection segment and said upper conduit segment.

2. The device of claim 1, further comprising a filter disk positioned within said inflow end of said housing, such that liquid flowing through said inflow conduit passes through said filter disk prior to passing through said apertured midsection segment.

3. The device of claim 1, further comprising a filter means surrounding said apertured midsection segment.

4. The device of claim 2, further comprising a filter means surrounding said apertured midsection segment.

5. The device of claim 3, further comprising granular treatment media disposed within said housing, where said filter means prevents said treatment media from entering said apertured midsection segment.

6. The device of claim 4, further comprising granular treatment media disposed within said housing, where said filter means prevents said treatment media from entering said apertured midsection segment.

7. The device of claim 1, where the size of said intake aperture and said dispensing aperture are small relative to the size of said at least one flow opening in said apertured midsection.

8. The device of claim 7, where said intake aperture and said dispensing aperture are between 1/32 and 3/16 inches in diameter.

9. The device of claim 1, where said inflow conduit and said outflow conduit are coaxially aligned.

10. The device of claim 1, where at least one of said inflow end and said outflow end is detachable from said main body whereby said dispenser means can be removed from said housing.

11. A uni-directional flow chemical dispenser device for introducing a chemical solution into a flow of liquid said device comprising:

a housing adapted to be incorporated into a flow conduit line, said housing having an inflow end with an inflow conduit adapted to receive an inlet conduit and an outflow end with an outflow conduit adapted to receive an outlet conduit connected to a main body;

a chemical dispenser means disposed within said housing and comprising an upper conduit segment connected to an apertured midsection segment connected to a lower chemical containing cartridge member;

a filter disk positioned within said inflow end of said housing, such that liquid flowing through said inflow conduit passes through said filter disk prior to passing through said apertured midsection segment;

said apertured midsection segment having at least one flow opening to allow liquid to flow into said upper conduit segment;

said cartridge member comprising a closed bottom, a side wall containing at least one intake aperture positioned in the upper portion of said side wall, and a top containing at least one dispensing aperture, said bottom, top and side wall defining an interior and containing a chemical in solid form;

whereby liquid enters said housing through said inflow conduit, flows past said cartridge member, through said at least one flow opening in said apertured midsection segment, through said upper conduit segment and exits said housing through said outflow conduit;

and further whereby as liquid passes said cartridge member, a small amount of said liquid enters said cartridge member through said intake aperture and contacts said chemical to dissolve said chemical and form a saturated chemical solution within said cartridge interior, and whereby said saturated solution is drawn from said cartridge member through said dispensing aperture in response to liquid flow through said apertured midsection segment and said upper conduit segment.

12. The device of claim 11, further comprising a filter means surrounding said apertured midsection segment.

13. The device of claim 12, further comprising granular treatment media disposed within said housing, where said filter means prevents said treatment media from entering said apertured midsection segment.

14. The device of claim 11, where the size of said intake aperture and said dispensing aperture are small relative to the size of said at least one flow opening in said apertured midsection.

15. The device of claim 14, where said intake aperture and said dispensing aperture are between 1/32 and 3/16 inches in diameter.

16. The device of claim 11, where said inflow conduit and said outflow conduit are coaxially aligned.

17. The device of claim 11, where at least one of said inflow end and said outflow end is detachable from said main body whereby said dispenser means can be removed from said housing.

18. a uni-directional flow chemical dispenser device for introducing a chemical solution into a flow of liquid, said device comprising:

a housing adapted to be incorporated into a flow conduit line, said housing having an inflow end with an inflow conduit adapted to receive an inlet conduit and an outflow end with an outflow conduit adapted to receive an outlet conduit connected to a main body;

a chemical dispenser means disposed within said housing and comprising an upper conduit segment connected to an apertured midsection segment connected to a lower chemical containing cartridge member;

a granular treatment media retained within an apertured annular container disposed around said dispenser means;

said apertured midsection segment having at least one flow opening to allow liquid to flow into said upper conduit segment;

said cartridge member comprising a closed bottom, a side wall containing at least one intake aperture positioned in the upper portion of said side wall, and a top containing at least one dispensing aperture, said bottom, top and side wall defining an interior and containing a chemical in solid form;

whereby liquid enters said housing through said inflow conduit, flows past said cartridge member, through said at least one flow opening in said apertured midsection segment, through said upper conduit segment and exits said housing through said outflow conduit;

and further whereby as liquid passes said cartridge member, a small amount of said liquid enters said cartridge member through said intake aperture and contacts said chemical to dissolve said chemical and form a saturated chemical solution within said cartridge interior, and whereby said saturated solution is drawn from said cartridge member through said dispensing aperture in response to liquid flow through said apertured midsection segment and said upper conduit segment.

19. The device of claim 18, further comprising an annular seal member positioned between said housing and said upper conduit segment.

20. The device of claim 18, further comprising a filter disk positioned within said inflow end of said housing, such that liquid flowing through said inflow conduit passes through said filter disk prior to passing through said apertured midsection segment.

21. The device of claim 18, where the size of said intake aperture and said dispensing aperture are small relative to the size of said at least one flow opening in said apertured midsection.

22. The device of claim 21, where said intake aperture and said dispensing aperture are between $1/32$ and $3/16$ inches in diameter.

23. The device of claim 18, where said inflow conduit and said outflow conduit are coaxially aligned.

24. The device of claim 18, where at least one of said inflow end and said outflow end is detachable from said main body whereby said dispenser means can be removed from said housing.

* * * * *